April 25, 1939.　　　　E. J. WELLS　　　　2,155,573
MACHINE TOOL
Filed Jan. 11, 1938　　　3 Sheets-Sheet 2

Elmer J. Wells
INVENTOR
BY
ATTORNEY

April 25, 1939.  E. J. WELLS  2,155,573
MACHINE TOOL
Filed Jan. 11, 1938  3 Sheets-Sheet 3

Elmer J. Wells,
INVENTOR;
BY
ATTORNEY.

Patented Apr. 25, 1939

2,155,573

UNITED STATES PATENT OFFICE 2,155,573

MACHINE TOOL

Elmer J. Wells, Alhambra, Calif.

Application January 11, 1938, Serial No. 184,398

7 Claims. (Cl. 29—39)

My invention relates generally to machine tools, and more particularly to mechanism used in connection with automatic screw machines for the performance of special operations upon the work or stock; and its objects are to provide means for finishing the outside surface of the work or stock either simultaneously with or apart from the operation performed by one of the turret tools; to render it unnecessary to mount the outer finishing tool upon the turret while permitting said tool to be moved in the same direction as the movement of the turret; to avoid the dragging of the cutting edge of said tool back across the stock and impairing the accuracy of the cut after finishing the outer surface of the said stock; to insure a smooth helical cut of said outer surface of great accuracy without the necessity that the same be subsequently tooled or ground; to provide an axially-moved finishing tool holder and automatic means for returning the same to its initial position before the cutting off operation is completed, so that the tool is positioned for making a succeeding finishing cut on the next object to be produced at the proper moment in the cycle, and to feed the finishing tool carrier longitudinally by thrust of the turret.

My invention, which consists in the novel provision, combination and interrelation of parts, members and features hereinafter disclosed, possesses other objects and features of advantage some of which, with the foregoing, will be set out or be apparent in the following description of a preferred form of the invention, which is illustrated in the accompanying drawings wherein similar numerals of designation refer to similar parts throughout the several views, and in which Figure 1 is a plan view of my improved automatic screw machine in actual operation, showing the finishing tool mounted upon its carriage and the moving mechanism adjacent thereto;

Figure 1:
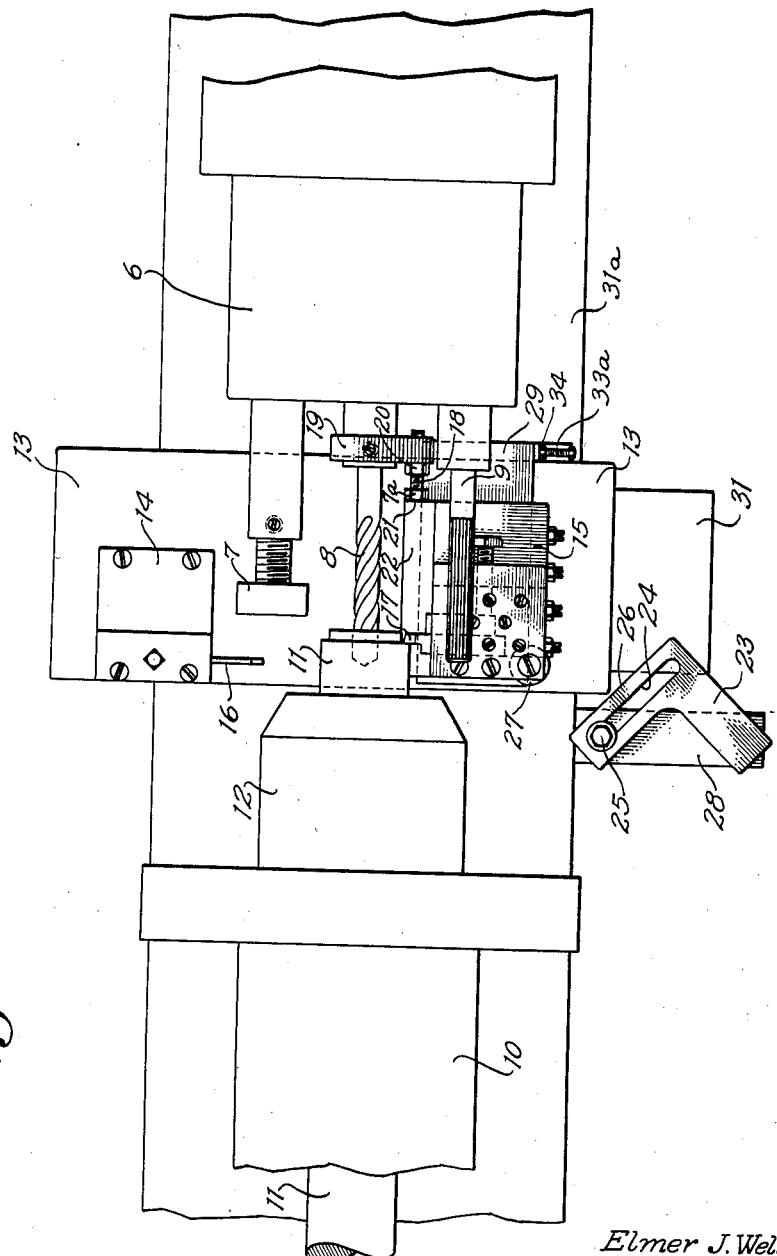
Figure 2:
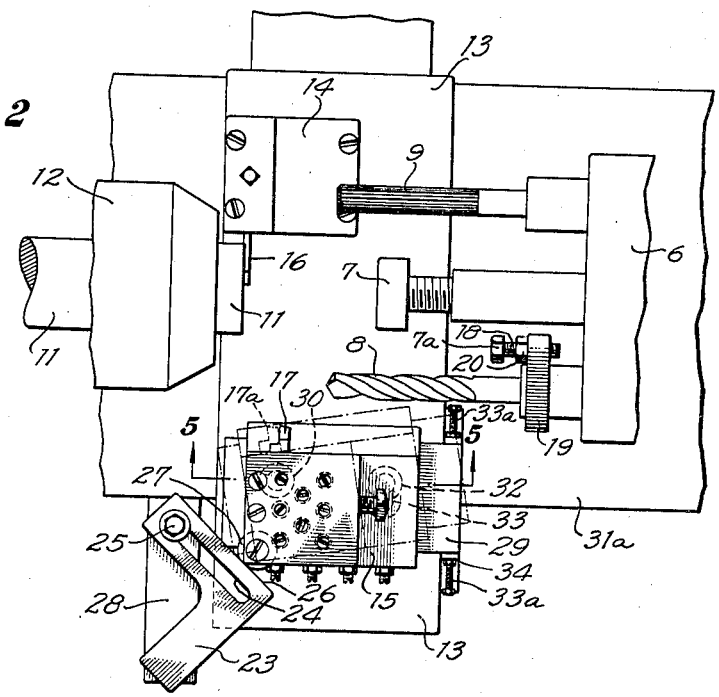
Figure 2 is an enlarged view of the automatic screw machine and movable parts shown in Figure 1, the finishing tool being shown out of operative position just after the cutting off of the finished piece.
Figure 3:
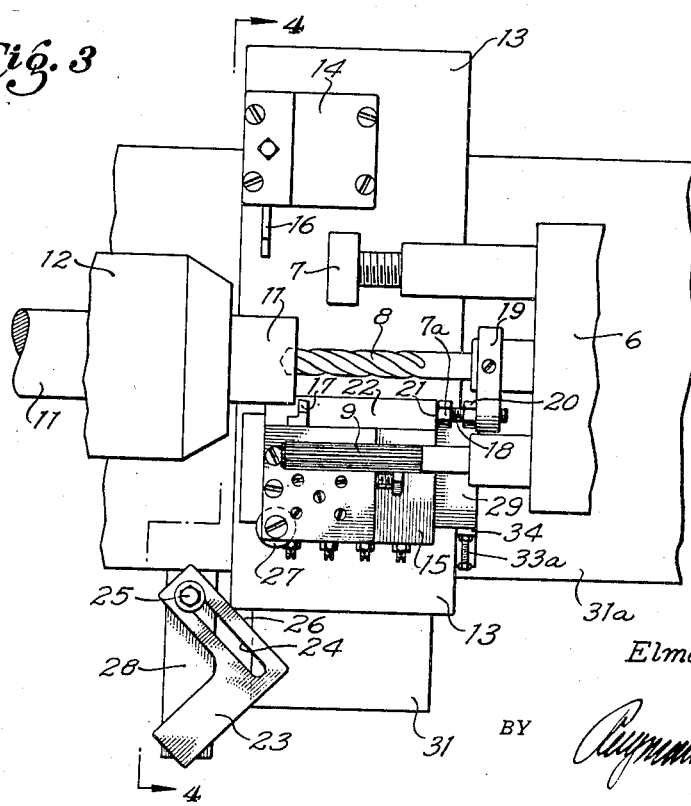
Figure 3 is a similar view, showing the finishing tool being fed longitudinally toward the stock and about to perform the helical cut thereon.
Figure 4:
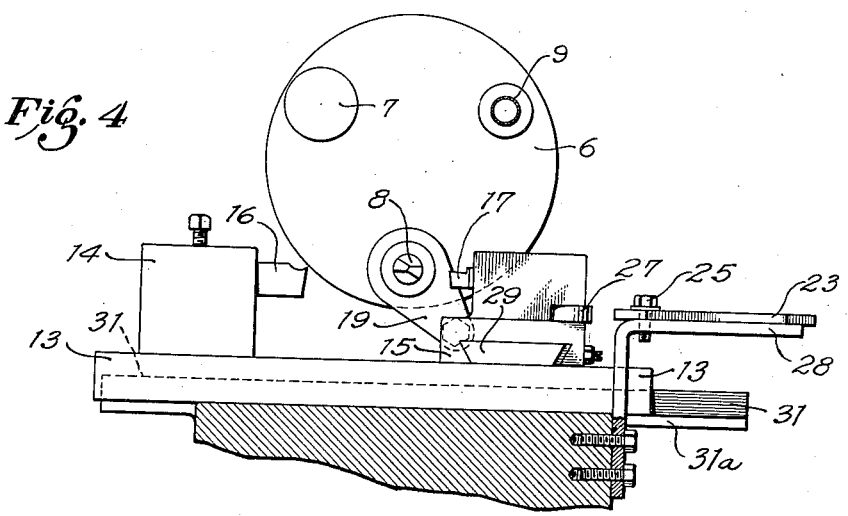
Figure 4 is a vertical transverse section of my improved apparatus, showing the operative end of the turret in elevation, the location of the cutting tools and finishing tool and adjacent parts.
Figure 5:
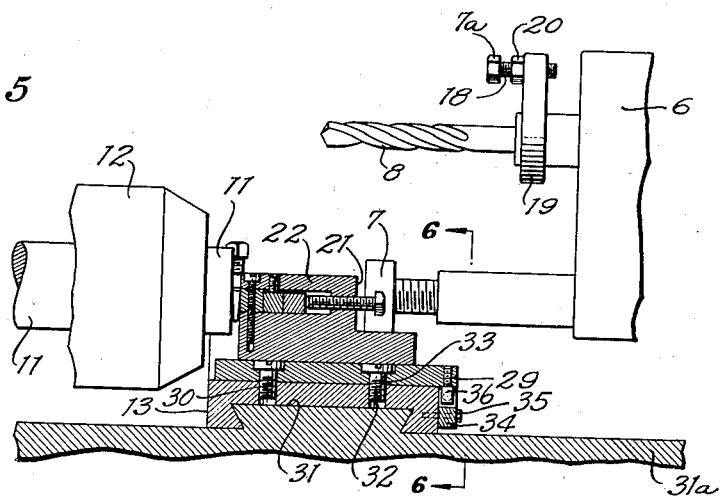
Figure 6:
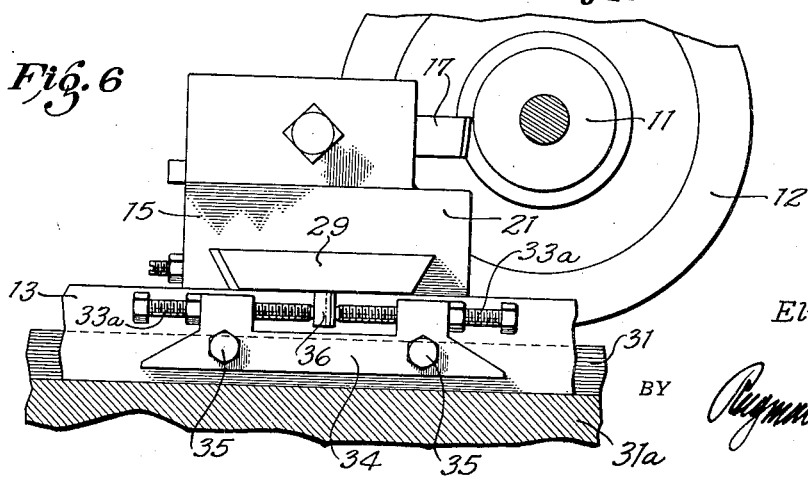

Figure 5 is a vertical longitudinal section on line 5—5 of the finishing tool and its carrier shown in Figure 2, the push block and parts being shown in side elevation, and adjusted to impart a forward movement to the finishing tool; and Figure 6 is an enlarged detail transverse sectional view taken upon the line 6—6, Figure 5, and looking in the direction of the appended arrows, and showing more particularly means for adjusting the tool bit to change its path of cut.

In the drawings:

I have shown an automatic screw machine having a turret or cylindrical member 6 provided with openings at one end thereof for the reception of a number of implements or tools, such as, for example, a gauge stop 7, drill 8 and reamer 9, said openings being preferably spaced equidistantly apart as is usual in this form of device to accommodate each a different kind of implement or tool. While I have shown only three such implements or tools, more could be provided if desired should the character of the work so require. As is well known in the art, the turret 6 is arranged to slide axially within a cylindrical bearing (not shown), the face of the end carrying the tools facing the headstock 10. Also I employ the usual automatic devices to move the turret 6 to feed one of its tools to the metal stock 11, which is being worked and which is being gripped in a chuck 12 rotated in the usual manner in the headstock 10.

As is usual, when either of the tools, such as 8 or 9, has penetrated the metal stock 11 to the desired depth or distance, the feed forward (that is, toward the headstock 10) ceases, the turret 6 automatically moves quickly back to clear the stock 11, and then turns arcuately through the spaced between tools so as to bring another tool into position. The turret thereupon again moves forward toward the stock and brings the tool in contact therewith, and such stock continues to rotate until the desired depth of cut or bore is reached when the feed is stopped, and the process of withdrawal and tool shifting repeated until the metal stock is formed completely in every desired respect, excepting as about to be stated.

In the automatic screw machines prior to my invention it has been customary to effect the finishing of such outer surface by the longitudinal movement of a finishing tool carried by and thrust forward by the turret. Such operation, however, is open to the objection that at the end thereof the cutting edge of such tool will necessarily have to be dragged back over the outer surface of the finished stock, thereby scratching or marring the same and often so impairing its appearance that refinishing is necessary or desirable after the finished piece is cut off by the cutting-off tool. This necessity is obviated in my new form of construction.

In my improved apparatus, for the purpose of finishing the exterior of the piece blank, I provide the cross carriage or carrier 13, here shown as having mounted thereon two tool blocks 14, and 15, said carriage being moved automatically by the well known power feed mechanism across the shears, or in a direction from the outer surface of the metal stock 11 inwardly toward the center thereof. In accordance with the usual form of construction, the carriage 13 has a definite cross path, so that the cutting-off tool 16 carried by the tool block 14 affixed to one end of such carriage will cut off the exact length desired, being arranged to be fed automatically inward radially. The length of travel of the cutting edge of the finishing tool 17 is sufficient to extend over the entire length of each object made, as it is thrust forward by a push block 7a. Such outer finishing may be made during or after the turret operations. After the external finishing has been accomplished, the cutting off tool 16 is fed transversely into the metal stock until the object has been cut off.

Thus my new and improved finishing tool is constructed and arranged to be attached to or combined with the standard automatic screw machine with all of its usual equipment, and includes the addition of the tool block 15 movably mounted upon the cross-carriage 13. This block 15 is arranged to move with said carriage in its usual cross path, and is also arranged to move upon such carriage in the same direction in which the turret moves. The said block 15 may be connected as shown to the same automatic cross feed which actuates the cutting of the cutting-off tool 16, or it may have its own independent cross feed. So far as concerns the cross movement of the tool block 15, this is accomplished by the mounting of its carriage 13 to run upon the dovetail track 31 which is integral with or is secured to the main frame or shears 31a of the turret lathe, and so far as concerns the longitudinal movement (or movement in the direction of the line of travel of the turret) of said tool block 15, the said block is mounted to run upon the dovetail track 29, which is pivotally mounted upon the carriage 13 by screw 30, disposed in the inner corner of said plate nearest adjacent the head stock 10.

The plate 29 is normally disposed so that the tool bit 17 will produce a cut in a path parallel with the longitudinal axis of the machine tool. In order that tapered cuts may be given the work, it is required that the tool bit 17 be swung in the direction of or into the position shown by the dotted line indication 17a in Figure 2, and to that end it is requisite that the corner of the plate 29 next adjacent to the turret 6 be swung toward the longitudinal axis of the turret; and it is likewise required that when this has taken place to the predetermined degree and amount requisite to impart the desired taper of cut, such plate 29 be secured temporarily and to such ends in that position. To provide for this, a further screw 32 is mounted in the dovetail carriage 13 upon which the plate 29 rests and the same is fillister-headed, such head entering a short elongated slot 33 countersunk into the top of the plate 29 and shown in dotted lines in Figure 2, the same having a curvature the radius of which springs from the pivotal screw 30. In order to finally adjust the plate 29 in its pivotal play, there are provided two elongated adjusting and locking screws 33a which are both mounted for adjustment in a bracket 34 bolted as at 35 to that end of the dovetail carriage 13 which is nearest adjacent the screw 32. The ends of these adjusting screws 33a are axially opposed to each other and disposed to bear against a stud 36 which depends from the plate 29. In adjusting the plate 29 pivotally upon its axis screw 30, one adjusting screw 33a is caused to retreat from the stud 36 to allow way for the stud in the swinging motion of the plate 29. This swinging motion may be effected if desired by the other screws 33a. When the swinging motion has been completed, the fillister headed screw 32 is set down so that its head, which has in effect traversed the elongated slot 33 in the adjustment, to an extent, bears against the plate 29; and the two adjusting screws 33a which likewise serve as locking screws are brought to bear against the stud 36; and conjointly these three screws with the screw 30, which prior to the plate adjustment is loosened and, after the adjustment, is tightened, hold the plate firmly in its position of adjustment so that the desired tapered cut may be given by the tool bit 17.

The push block 7a is made adjustable longitudinally in respect to the tool face of the turret 6 by reason of the threaded engagement of the shank 18 of said block with the sleeve or holder 19 normally held in one of the tool openings in said tool face; the lock nut 20 (see Figure 5) serving to lock said push block in operative position after said adjustment has been made. Arranged to contact with the head of the push block 7a when the same is in operative position on the turn of the turret is the surface 21 of the abutment 22, whereby the longitudinal thrust of the turret may be communicated to the tool block 15, gradually to feed it toward and into the stock 11. Obviously, when the tool 17 is mounted upon the end of the tool block 15, and set accurately at the desired distance from the center or axis of the stock 11, the movement forward of the push block 7a will move such push block simultaneously with one of such other turret tools such as the drill 8.

After the turret tool operation, accompanied by a complete movement of the finishing tool, the latter is left in position until the back movement of the cross carriage 13 begins to affect the operation of the cutting off tool 16 and to move the finishing tool 17 laterally away from the stock. As a result, when all of the turret operations are finished, the turret 6 is withdrawn, leaving a space between it and my additional tool block 15; and automatically the well-known transverse feed mechanism begins moving the cutting-off tool 16 and its block 14 upon the cross carriage 13 toward and into the metal stock 11. At the same time this mechanism (or an independent one) moves the tool block 15 outwardly and away from the stock. Clamped to the bracket 28 secured to the lathe frame or shears is a cam member 23, which is preferably a flat elbow plate, provided with the slot 24, through which passes the threaded shank of the bolt 25, and which is in threaded engagement with an opening in said bracket and serves to hold the same in adjusted position, so that the angularly disposed edge 26 of said bracket will act as a cam surface against the roller 27 mounted upon the tool block 15. As the said tool block 15 moves outwardly transversely, the said roller 27 contacts with said edge 26, thereby converting in part said transverse motion into one longitudinal in character, with the result that when the cutting-off tool 16 has moved sufficiently with the cross carriage or carrier 13 to complete its work, the tool block 15 has moved toward the withdrawn turret 6 sufficiently to bring the finishing tool 17 back into its initial position. Thereafter the tool block 15 is moved back into its original lateral position by movement of the cutting-off tool 16 and block 14, upon the cross carriage or carrier 13, back to its initial position, or if the tool blocks be separately mounted, by independent cross carriage mechanism. Then the tool 17 is ready to be fed forward again through the next cycle.

My invention may be embodied in other specific forms without departing from the spirit or essential characteristics thereof. The present embodiment of my invention as herein set forth is, therefore, to be considered in all respects as illustrative and not restrictive, the scope of my invention being indicated by the appended claims rather than by the foregoing description, and all changes which come within the meaning and range of equivalency of elements contained within the claims are, therefore, intended to be embraced therein.

Having thus disclosed my invention, I claim and desire to secure by Letters Patent:

1. In mechanism of the character disclosed, the combination of a tool holding turret, rotatable gripping means for the stock, mechanism for moving longitudinally said turret toward and away from stock carried by said gripping means, a finishing tool carrier, means for feeding said carrier longitudinally forward toward said stock in the thrust of the turret, and cam means for thereafter moving said carrier laterally away from said stock and back to its initial position.

2. In mechanism of the character disclosed, the combination of a tool holding turret, rotatable gripping means for the stock, a carrier, means for moving said carrier across the line of direction of travel of said turret, a finishing tool block mounted to move upon said carrier in the same direction as said turret and also with said carrier, push block means for feeding said tool block toward said stock by the thrust of said turret, and means for thereafter moving said tool block laterally away from said stock and also at an angle to the play of said carrier and back to an initial position.

3. In mechanism of the character disclosed, the combination of a tool holding turret, rotatable gripping means for the stock, a carrier, means for moving said carrier across the direction of line of travel of said turret, a cutting-off tool block and a finishing tool block both mounted upon said carrier, a track upon said carrier for said finishing tool block permitting the same to move in the same direction as said turret, means for feeding said finishing tool block toward said stock by thrust of said turret and for moving said tool block transversely of the path of play of said carrier.

4. In mechanism of the character disclosed, the combination of a tool holding turret, rotatable gripping means for the stock, a carrier, means for moving said carrier across the line of direction of travel of said turret, a cutting-off tool block and a finishing tool block both mounted upon said carrier, means upon said carrier for allowing said finishing tool block to move in the same direction as said turret, push block means mounted upon said turret for feeding said finishing tool toward said stock by thrust of said turret, and means for thereafter moving said finishing tool block laterally away from said stock and back to its initial position and also at an angle to the path of movement of said carrier.

5. In mechanism of the character disclosed, the combination of a tool holding turret, rotatable gripping means for the stock, mechanism for moving longitudinally said turret to and from said stock, a finishing tool carrier, means for feeding said carrier toward said stock by thrust of the turret and simultaneously permitting the application of both said finishing tool and one of the cutting tools of the turret to operate upon said stock, and means for thereafter moving said finishing tool laterally away from said stock and also in a path at an angle to such lateral movement.

6. In mechanism of the character disclosed, the combination of a tool holding turret, rotatable gripping means for the stock, mechanism for moving longitudinally said turret to and from said stock, a finishing tool carrier, push block means secured to one of the tools of said turret for feeding said carrier toward and up to said stock and simultaneously permitting said turret tool and said finishing tool to contact and operate upon said stock, and means for thereafter moving the finishing tool laterally away from said stock and also in a direction at an angle to such lateral movement.

7. In mechanism of the character disclosed, the combination of a tool holding turret, rotatable gripping means for the stock, mechanism for moving longitudinally said turret to and from said stock, a tool block carrier, an angularly adjustable finishing tool carried by said block, means for feeding said carrier longitudinally forward toward said stock by the thrust of said turret, and means for thereafter moving said carrier away from said stock and for moving said block in a path at an angle to such latter movement.

ELMER J. WELLS.